United States Patent
Orzelski et al.

(10) Patent No.: US 7,959,224 B2
(45) Date of Patent: Jun. 14, 2011

(54) ACTIVE HEAD RESTRAINT HAVING MULTIPLE HORIZONTAL PIVOT POINTS

(75) Inventors: Zbigniew J. Orzelski, Bloomfield Hills, MI (US); Joseph Benjamin Watson, Lincoln Park, MI (US); Mohamed S. Hamieh, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 12/405,436

(22) Filed: Mar. 17, 2009

(65) Prior Publication Data

US 2010/0237676 A1   Sep. 23, 2010

(51) Int. Cl.
B60N 2/42 (2006.01)
B60N 2/427 (2006.01)

(52) U.S. Cl. .................................. 297/216.12
(58) Field of Classification Search .............. 297/216.12
See application file for complete search history.

(56) References Cited

U.S. PATENT DOCUMENTS

| | | | |
|---|---|---|---|
| 5,795,019 A | 8/1998 | Wieclawski | |
| 5,829,838 A | 11/1998 | Offenbacher | |
| 5,927,804 A * | 7/1999 | Cuevas | 297/216.12 |
| 6,019,424 A * | 2/2000 | Ruckert et al. | 297/216.12 |
| 6,179,379 B1 * | 1/2001 | Andersson | 297/216.12 X |
| 6,250,714 B1 | 6/2001 | Nakano et al. | |
| 6,416,125 B1 | 7/2002 | Shah et al. | |
| 6,565,150 B2 * | 5/2003 | Fischer et al. | 297/216.12 |
| 6,568,753 B1 | 5/2003 | Watanabe | |
| 6,631,949 B2 | 10/2003 | Humer et al. | |
| 6,631,955 B2 | 10/2003 | Humer et al. | |
| 6,655,733 B2 | 12/2003 | Humer et al. | |
| 6,749,256 B1 | 6/2004 | Klier et al. | |
| 6,871,913 B2 * | 3/2005 | Malsch et al. | 297/216.12 X |
| 6,955,397 B1 | 10/2005 | Humer | |
| 6,983,996 B2 | 1/2006 | Svantesson | |
| 7,097,242 B2 | 8/2006 | Farquhar et al. | |
| 7,104,602 B2 | 9/2006 | Humer et al. | |
| 7,118,174 B2 | 10/2006 | Lee | |
| 7,204,552 B2 | 4/2007 | Ishizuka | |
| 7,374,239 B1 | 5/2008 | Jayasuriya et al. | |
| 7,455,357 B2 | 11/2008 | Humer et al. | |
| 7,699,394 B2 * | 4/2010 | Humer et al. | 297/216.12 |
| 7,758,114 B2 * | 7/2010 | Yokota et al. | 297/216.12 |
| 7,823,971 B2 * | 11/2010 | Humer et al. | 297/216.12 |
| 7,857,381 B2 * | 12/2010 | Humer et al. | 297/216.12 |
| 7,874,616 B2 * | 1/2011 | D'Agostini | 297/216.12 |
| 7,891,734 B2 * | 2/2011 | Humer et al. | 297/216.12 |
| 2002/0050729 A1 | 5/2002 | Nakano | |

(Continued)

*Primary Examiner* — Rodney B White
(74) *Attorney, Agent, or Firm* — Gregory Brown; Price, Heneveld, Cooper, DeWitt & Litton, LLP

(57) ABSTRACT

A system comprising a seat having upper and lower members, a restraint, and a connector assembly having first and second members connected with the restraint and the seat. The first member has a top and a bottom, with the top being connected to the restraint and being pivotally connected to the upper member at an upper pivot point. The second member has a top and a bottom, with the top being pivotally connected to the bottom of the first member at a middle pivot point, and the bottom being pivotally connected to the lower member at a lower pivot point. The upper and lower pivot points are fixed relative to the seat. The first member pivots about the upper pivot point and the second member pivots about the lower pivot point. Aft movement of the middle pivot point results in fore movement of the restraint.

22 Claims, 7 Drawing Sheets

U.S. PATENT DOCUMENTS

| | | |
|---|---|---|
| 2004/0075312 A1 | 4/2004 | Neale |
| 2006/0103190 A1 | 5/2006 | Humer et al. |
| 2006/0255632 A1 | 11/2006 | Sugimoto |
| 2007/0085390 A1 | 4/2007 | Kawashima et al. |
| 2009/0001785 A1* | 1/2009 | Swan et al. .............. 297/216.12 |
| 2009/0102255 A1* | 4/2009 | D'Agostini et al. ...... 297/216.12 |
| 2010/0066136 A1* | 3/2010 | D'Agostini .............. 297/216.12 |
| 2010/0148545 A1* | 6/2010 | Omori ...................... 297/216.12 |
| 2010/0156154 A1* | 6/2010 | Humer et al. ............ 297/216.12 |
| 2010/0320817 A1* | 12/2010 | Humer et al. ............ 297/216.12 |

* cited by examiner

US 7,959,224 B2

ACTIVE HEAD RESTRAINT HAVING MULTIPLE HORIZONTAL PIVOT POINTS

FIELD OF THE INVENTION

The present invention concerns vehicles, and more particularly relates to an active head restraint for a vehicle seat having multiple horizontal pivot points.

BACKGROUND OF THE INVENTION

Automotive vehicle seats may include a head restraint positioned at a top of a seat back. Some head restraints may be adjustable. Adjustable head restraints are configured to move up and down relative to the seat back. Some head restraints may be active. Active head restraints are configured to move forward relative to the seat back during a rear impact event.

A head restraint may be connected with a seat back via mounting posts. The mounting posts are anchored to a structure forming the head restraint. Mounting posts of an adjustable head restraint are moveable relative to the seat back.

A head restraint of an automotive vehicle seat limits rearward movement of a head of an occupant. During a rear impact event, the occupant may be pressed into the seat due to differences in velocity between the seat and the occupant. As the occupant is pressed into the seat, the head of the occupant contacts the head restraint after some delay.

SUMMARY OF THE PRESENT INVENTION

An aspect of the present invention is to provide an active head restraint system for an occupant of an automotive vehicle. The system includes a seat, a head restraint and a connector assembly. The seat has a first side member, a second side member, an upper cross member and a lower cross member. The head restraint is configured to support a head of the occupant. The connector assembly is connected with the head restraint and the seat. The connector assembly has a first member and a second member. The first member has a first top end and a first bottom end. The first top end is connected to the head restraint. The first member is pivotally connected to the upper cross member at an upper pivot point. The second member has a second top end and a second bottom end, with the second top end being pivotally connected to the first bottom end of the first member at a middle pivot point. The second bottom end is pivotally connected to the lower cross member at a lower pivot point. The upper pivot point is fixed relative to the upper cross member and the first member. The first member pivots about the upper pivot point. The lower pivot point is fixed relative to the lower cross member. The second member pivots about the lower pivot point. Aft movement of the middle pivot point results in fore movement of the head restraint.

Another aspect of the present invention is to provide an active head restraint system for an occupant of an automotive vehicle comprising a seat, a head restraint, a push plate and a connector assembly. The seat has a first side member, a second side member, an upper cross member and a lower cross member. The head restraint is configured to support a head of the occupant. The push plate is configured to receive a back of the occupant during vehicle impact. The connector assembly is connected with the push plate and head restraint, with the connector assembly having a first member and a second member. The first member has a first top end and a first bottom end, with the first top end being connected to the head restraint and being pivotally connected to the upper cross member at an upper pivot point. The second member has a second top end and a second bottom end, with the second top end being pivotally connected to the first bottom end of the first member at a middle pivot point, and with the second bottom end being pivotally connected to the lower cross member at a lower pivot point. At least one of the first member and the second member are connected to the push plate such that aft movement of the push plate results in fore movement of the head restraint. The upper pivot point is fixed relative to the upper cross member and the first member, with the first member pivoting about the upper pivot point. The lower pivot point is fixed relative to the lower cross member, with the second member pivoting about the lower pivot point.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
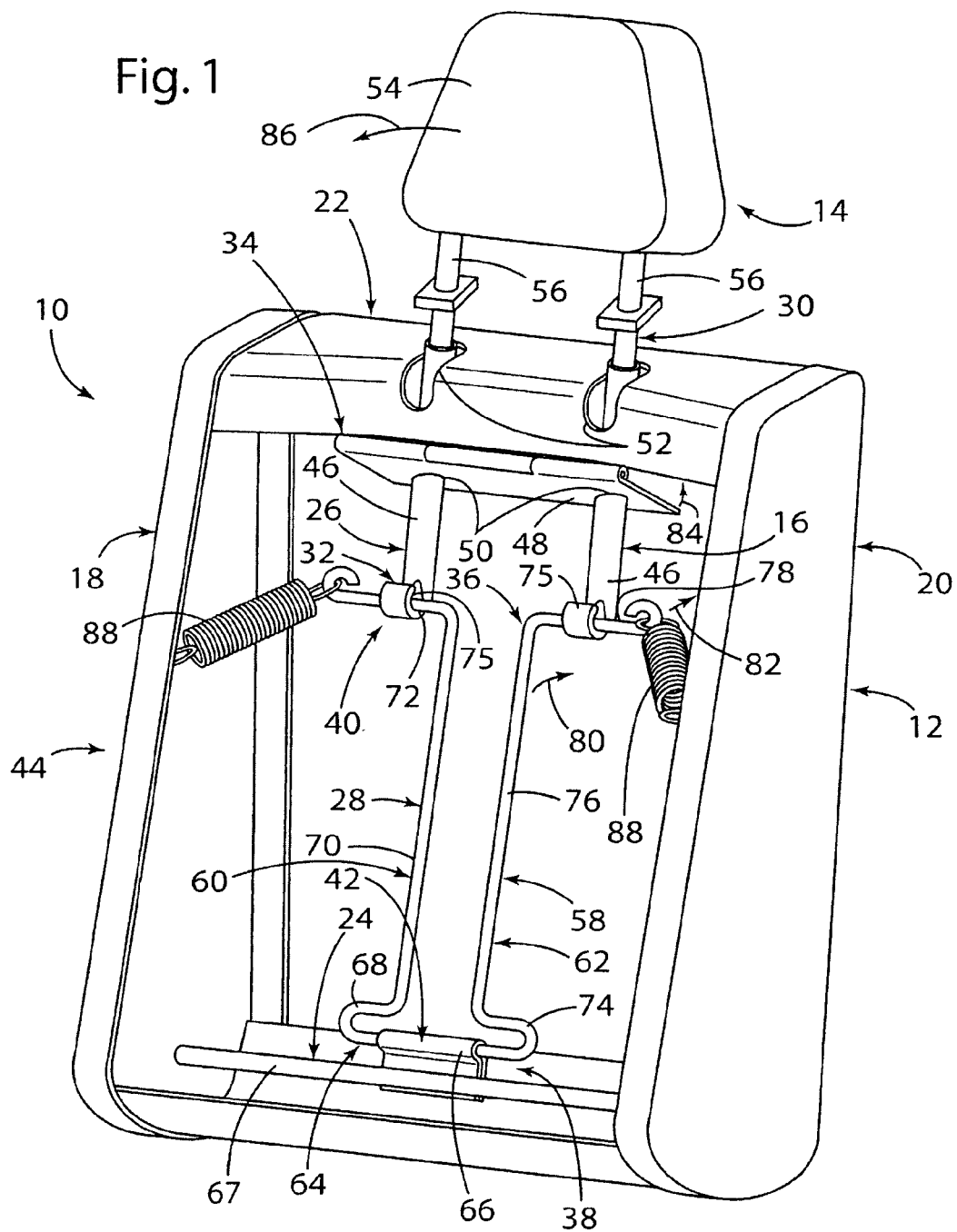
FIG. 1 is a perspective view of an active head restraint system of the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIG. 1) generally designates an active head restraint system of the present invention. The active head restraint system 10 is for an occupant of an automotive vehicle. The system 10 includes a seat 12, a head restraint 14 and a connector assembly 16. The seat 12 has a first side member 18, a second side member 20, an upper cross member 22 and a lower cross member 24. The head restraint 14 is configured to support a head of the occupant. The connector assembly 16 is connected with the head restraint 14 and the seat 12. The connector assembly 16 has a first member 26 and a second member 28. The first member 26 has a first top end 30 and a first bottom end 32. The first top end 30 is connected to the head restraint 14. The first member 26 is pivotally connected to the upper cross member 22 at an upper pivot point 34. The second member 28 has a second top end 36 and a second bottom end 38, with the second top end 36 being pivotally connected to the first bottom end 32 of the first member 26 at a middle pivot point 40. The second bottom end 38 is pivotally connected the lower cross member 24 at a lower pivot point 42. The upper pivot point 34 is fixed relative to the upper cross member 22 and the first member 26. The first member 26 pivots about the upper pivot point 34. The lower pivot point 42 is fixed relative to the lower cross member 24. The second member 28 pivots about the lower pivot point 42. Aft movement of the middle pivot point 40 results in fore movement of the head restraint 14.

The illustrated active head restraint system 10 is used to provide support to a head of an occupant of a vehicle during crash situations. Before any impact, the torso and buttocks regions of the occupant are typically in contact with the seat 12 and the head of the occupant is typically spaced from the head restraint 14. Upon a rear impact of a vehicle, the occupant of the vehicle compresses into a seatback 44 of the seat 12 as the head, neck and torso of the occupant move substantially in unison. There typically is a greater compression in the torso and buttocks regions than in the shoulder region of the occupant, with a gradual reduction up to the shoulder level as the body remains upright. As the occupant compresses into the vehicle seatback 44 of the seat 12, the initial load of the occupant tends to deflect the seatback 44 rearwardly (with the amount of deflection typically being in relation to the bending stiffness of the seatback 44). The seatback 44 may possibly deflect under the torso load prior to the head and neck of the occupant contacting the head restraint 14. The active head restraint system 10 brings the head restraint 14 forward to meet the head of the occupant during a crash situation to prevent the head from whipping against the head restraint 14.

In the illustrated example, the seat 12 is configured to support the occupant of the vehicle. The seat 12 can be any seat in the vehicle (e.g., driver's seat, front passenger's seat, and rear seat). The seat 12 includes a seat bottom portion (not shown) configured to support a bottom of the occupant and the seatback 44 interconnected to the seat bottom portion. The seatback 44 can be rotatble relative to the seat bottom portion to allow the seatback 44 to be angled relative to the seat bottom portion. The seatback 44 of the seat 12 includes the first side member 18, the second side member 20, the upper cross member 22 and the lower cross member 24. The seatback 44 can include cushions and/or other features (not shown) for supporting and providing comfort to the occupant. The head restraint 14 and the connector assembly 16 are associated with the seat 12 to protect the occupant of the vehicle.

Figure 2A:
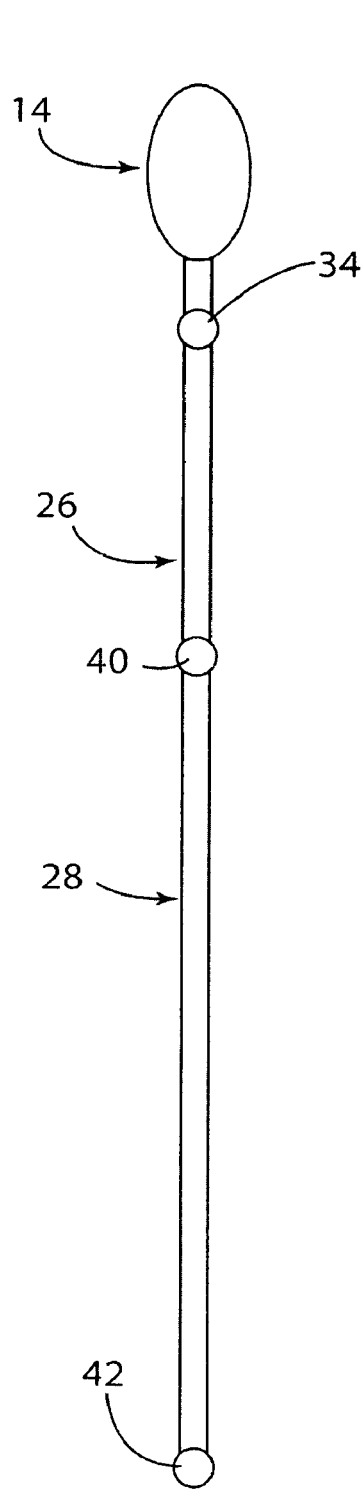
FIG. 2A is schematic side view of the active head restraint system of the present invention in an undeployed position.
Figure 2B:
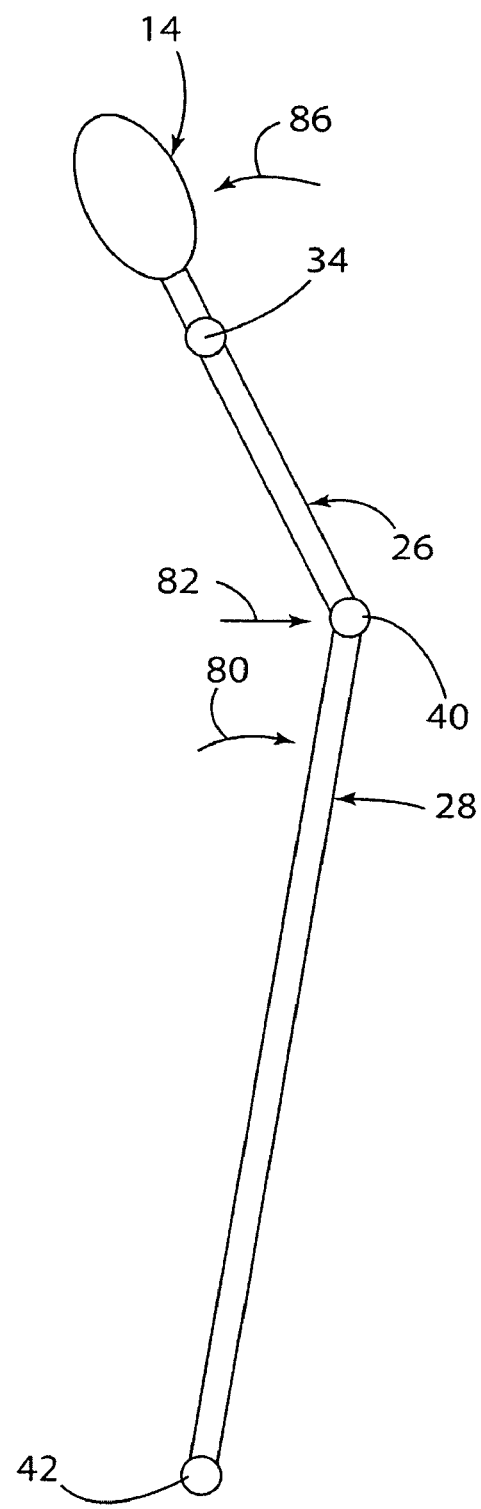
FIG. 2B is schematic side view of the active head restraint system of the present invention in a deployed position.

FIGS. 2A and 2B illustrate movement of the active head restraint system 10 before and during a crash situation. FIG. 2A illustrates the active head restraint system 10 in an initial position. In the initial position, the first member 26 and the second member 28 of the connector assembly 16 are not rotated. FIG. 2B illustrates the active head restraint system 10 during the crash situation. During the crash situation, the first member 26 pivots counter-clockwise about the upper pivot point 34 and the second member 28 pivots clockwise about the lower pivot point 42. Furthermore, the first member 26 pivots counter-clockwise about the middle pivot point 40 and the second member 28 pivots clockwise about the middle pivot point 40. Therefore, the head restraint 14 moves forward to meet the head of the occupant. According to an aspect of the present invention, rearward clockwise movement of the second member 28 about the lower pivot point 42 causes the middle pivot point 40 to move aftward and the rearward counter-clockwise movement of the first member 26 about the upper pivot point 34. It is contemplated that at least one of the first member 26 and the second member 28 is configured to lengthen during aft movement of the middle pivot point 40.

FIG. 1 illustrates a first embodiment of the active head restraint system 10 of the present invention. In FIG. 1, the first side member 18, the second side member 20, the upper cross member 22 and the lower cross member 24 are interconnected to substantially form a rectangle. The first member 26 of the connector assembly 16 is pivotally connected to the upper cross member 22. The first member 26 includes a pair of substantially parallel tubes 46 connected to a hinge plate 48. The hinge plate 48 has a pair of notches 50 therein. The pair of parallel tubes 46 are located within the notches 50 and are fixedly connected to the hinge plate 48. The hinge plate 48 is hingedly connected to the upper cross member 22 (e.g., either via a second hinge plate (not shown) or directly). The pivot point between the hinge plate 48 and the upper cross member 22 defines the upper pivot point 34. Therefore, the parallel tubes 46 and thereby the hinge plate 48 are configured to pivot about the upper pivot point 34. In the illustrated embodiment, the upper cross member 22 includes a pair of slots 52, with the pair of parallel tubes 46 extending through the slots 52. The head restraint 14 includes a padded head portion 54 and a pair of stem tubes 56. The stem tubes 56 are configured to be inserted into tops of the parallel tubes 46 of the first member 26 of the connector assembly 16 as is well known to those skilled in the art. It is contemplated that the stem tubes 56 and thereby the head restraint 14 can be vertically adjustably inserted into the parallel tubes 46 of the first member 26 of the connector assembly 16 to allow the padded head portion 54 to be raised and lowered.

The illustrated second member 28 of the connector assembly 16 is pivotally connected to the first member 26 of the connector assembly 16 to allow movement of the second member 28 to move the first member 26. The illustrated second member 28 includes a U-shaped wire member 58. The U-shaped wire member 58 includes a first side wire 60, a second side wire 62 and a bottom wire 64 connecting the first side wire 60 to the second side wire 62. The bottom wire 64 extends through a tube 66 of the bottom cross member 24 of the seat 12, with the bottom wire 64 being configured to rotate within the tube 66. Therefore, in the illustrated embodiment, the bottom wire 64 defines the lower pivot point 42. The tube 66 can be connected directly to a cross-bar 67 of the bottom cross member 24 or by any means (e.g., rivet, bolt, resistance welding, etc.) or can be part of the cross-bar 67. The first side wire 60 includes a C-shaped expandable section 68 connected to the bottom wire 64, a vertical section 70 and a top connection section 72. Likewise, the second side wire 62 includes a C-shaped expandable section 74 connected to the bottom wire 64, a vertical section 76 and a top connection section 78. As illustrated in FIG. 1, the top connection section 72 of the first side wire 60 and the top connection section 78 of the second side wire 62 extend through hooks 75 at bottoms of the parallel tubes 46 of the first member 26. The top connection section 72 of the first side wire 60 and the top connection section 78 of the second side wire 62 are allowed to rotate within the hooks 75, thereby defining the middle pivot point 40.

In the illustrated example, aft movement of the middle pivot point 40 results in fore movement of the head restraint 14. During a crash situation, the torso of the occupant will press against the second member 28, thereby rotating the second member 28 rearward along line 80 and about the lower pivot point 42. It is contemplated that the first side wire 60 and the second side wire 62 of the second member 28 could include a lumbar support mat (not shown) extending therebetween to assist the torso of the occupant in rotating the second member 28. Rotation of the second member 28 about the lower pivot point 42 will also cause the middle pivot point 40 to move rearward along line 82. Rearward or aft movement of the middle pivot point 40 causes the first bottom end 32 of the first member 26 to rotate rearward. Therefore, the first member 26 will rotate in a clockwise direction about the upper pivot point 34, causing the hinge plate 48 to rotate about line 84, the tops of the parallel tubes 46 to slide upward and forward through the slots 52 in the upper cross member 22, and the head restraint 14 to move upward and forward along line 86. As illustrated in FIG. 1, the seat 12 can include a pair of springs 88 connected to and extending between the first side member 18 and the second side member 20 of the seat 12 and the top connection section 72 of the first side wire 60 and the top connection section 78 of the second side wire 62 of the second member 28 at the middle pivot point 40 to bias the middle pivot point 40 forward and to move or maintain the active head restraint system 10 in the initial position.

In the illustrated active head restraint system 10, the upper pivot point 34 and the lower pivot point 42 do not change position. Therefore, the upper pivot point 34 is fixed in position relative to the upper cross member 22 of the seat 12 and the first member 26 of the connector assembly 16. Furthermore, the lower pivot point 42 is fixed in position relative to the lower cross member 24. In the illustrated example, the lower pivot point 42 is also fixed in position relative to the second member 28 of the connector assembly 16. However, as discussed in regard to alternative embodiments below, it is contemplated that the second member 28 of the connector assembly 16 could move relative to the lower pivot point 42, although the second member 28 of the connector assembly 16 would continue to pivot about the lower pivot point 42. Moreover, it is contemplated that at least one of the first member 26 and the second member 28 is configured to lengthen during aft movement of the middle pivot point 40. For example, the C-shaped expandable section 68 of the first side wire 60 and the C-shaped expandable section 74 of the second side wire 62 could expand during aft or rearward movement of the middle pivot point 40 to allow the middle pivot point 40 to move rearward. It is contemplated that the first member 26 and the second member 28 could lengthen in other manners during aft movement of the middle pivot point 40. For example, the first member 26 or second member 28 could either or both comprise two telescoping members.

Figure 3:
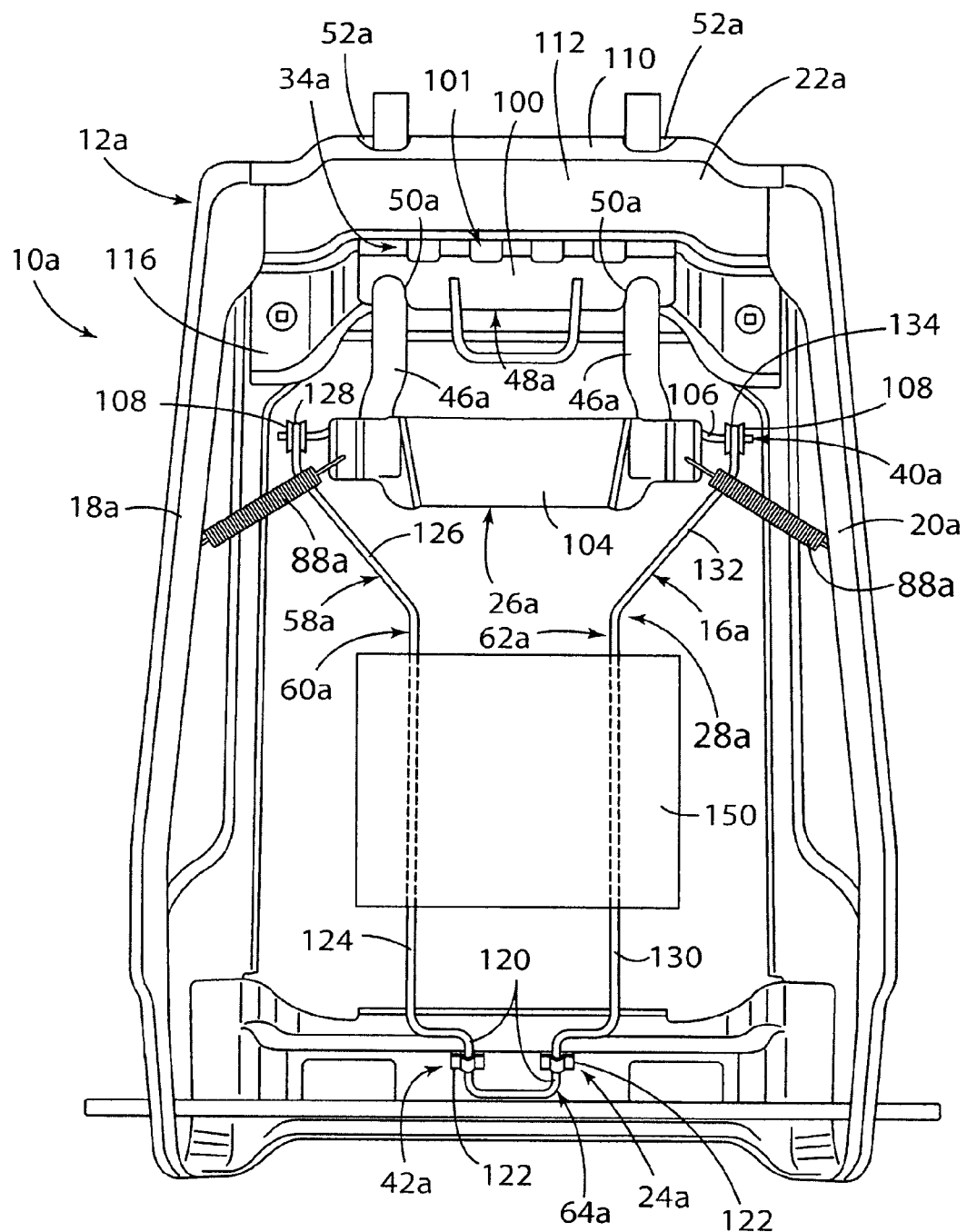
FIG. 3 is a front view of the active head restraint system of a second embodiment of the present invention.
Figure 4:
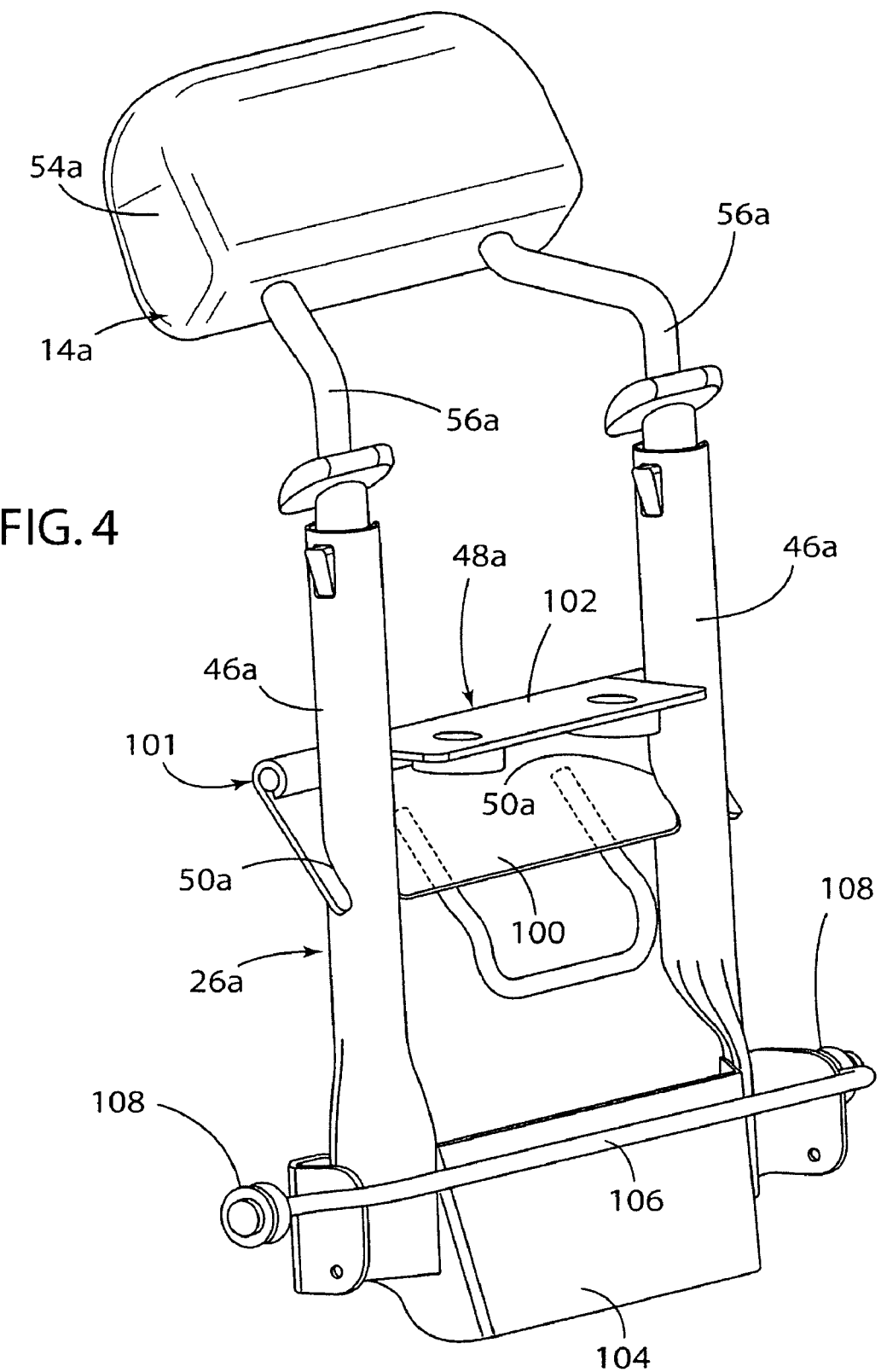
FIG. 4 is a perspective view of an upper member of a connector assembly and a head restraint of the active head restraint system of a second embodiment of the present invention.
Figure 5:
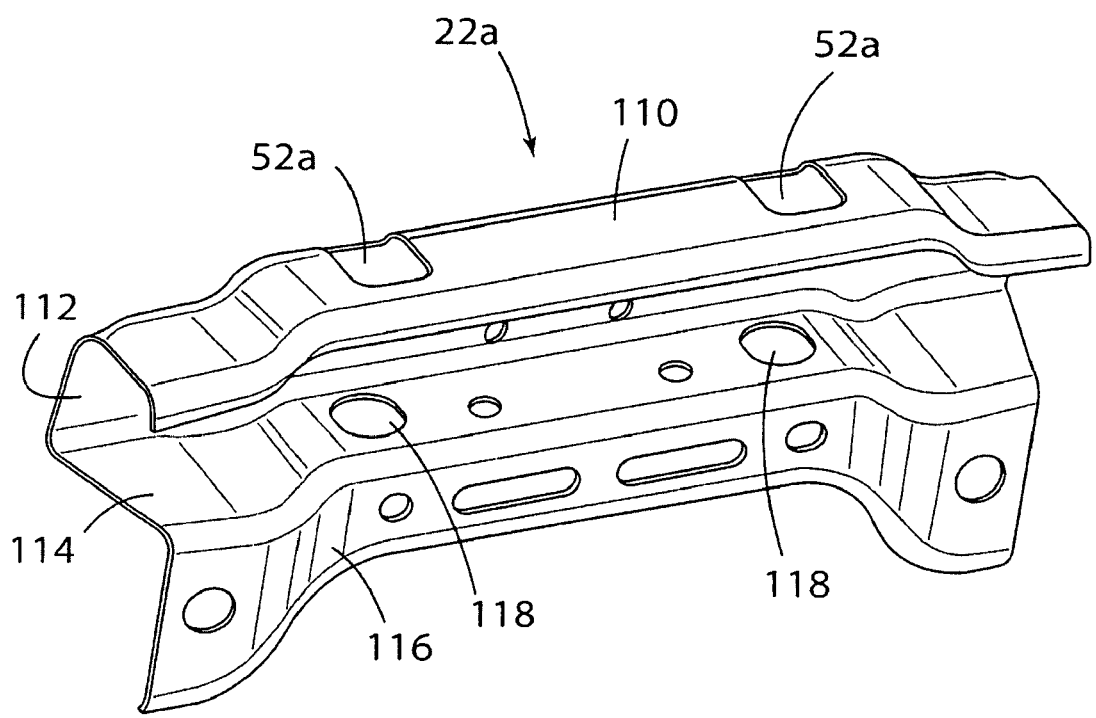
FIG. 5 is a rear perspective view of an upper cross member of a seat of the active head restraint system of a second embodiment of the present invention.

The reference numeral 10*a* (FIGS. 3-5) generally designates another embodiment of the present invention, having a second embodiment for the active head restraint system. Since bracket assembly 10*a* is similar to the previously described active head restraint system 10, similar parts appearing in FIGS. 1-2 and FIGS. 3-5, respectively, are represented by the same, corresponding reference number, except for the suffix "a" in the numerals of the latter. The active head restraint system 10*a* as illustrated in FIG. 3 includes the seat 12*a* and the connector assembly 16*a*. The head restraint 14*a* is illustrated as being connected to the connector assembly 16*a* in FIG. 4, but is not shown in FIG. 3 for illustrative purposes. The seat 12*a* has the first side member 18*a*, the second side member 20*a*, the upper cross member 22*a* and the lower cross member 24*a*. The connector assembly 16*a* has the first member 26*a* and the second member 28*a*. The first member 26*a* is pivotally connected to the upper cross member 22*a* at the upper pivot point 34*a*. The second member 28*a* is pivotally connected to the first member 26*a* at the middle pivot point 40*a*. The second member 28*a* is pivotally connected to the lower cross member 24*a* at the lower pivot point 42*a*. The upper pivot point 34*a* is fixed relative to the upper cross member 22*a* and the first member 26*a*. The first member 26*a* pivots about the upper pivot point 34*a*. The lower pivot point 42*a* is fixed relative to the lower cross member 24*a*. The second member 28*a* pivots about the lower pivot point 42*a*. Aft movement of the middle pivot point 40*a* results in fore movement of the head restraint 14*a*.

The illustrated connector assembly 16*a* of the second embodiment of the active head restraint system 10*a* functions similarly to the connector assembly 16 of the first embodiment of the active head restraint system 10 and has a similar structure. The first member 26*a* of the connector assembly 16*a* of the second embodiment of the active head restraint system 10*a* includes a pair of substantially parallel tubes 46*a* connected to a hinge plate assembly 48*a*. The hinge plate assembly 48*a* has a first plate 100 having a pair of notches 50*a* therein and a second plate 102 hingedly connected to the first plate 100 at a hinge 101. The pair of parallel tubes 46*a* are located within the notches 50*a* and are fixedly connected to the first plate 100. As discussed in more detail below, the second plate 102 is fixed to the upper cross member 22*a*. The pivot point between the first plate 100 and the second plate 102 fixedly connected the upper cross member 22*a* and defines the upper pivot point 34*a*. Therefore, the parallel tubes 46*a* and thereby the first plate 100 of the hinge plate 48*a* are configured to pivot about the upper pivot point 34*a*. The first member 26*a* of the connector assembly 16*a* also includes a push plate 104 extending between bottom ends of the parallel tubes 46*a* and a substantially U-shaped pivot rod 106 connected to the push plate 104. The U-shaped pivot rod 106 includes a pair of pivot rollers 108 configured to engage the second member 28*a* of the connector assembly 16*a* and define the middle pivot point 40*a*.

In the illustrated embodiment, the upper cross member 22*a* (FIG. 5) is connected to the first member 26*a* of the connector assembly 16*a*. The upper cross member 22*a* includes a top horizontal plate 110, a front side plate 112, a bottom horizontal plate 114 and a rear plate 116. The front side plate 112 extends between the top horizontal plate 110 and the bottom horizontal plate 114. The top horizontal plate 110 and the bottom horizontal plate 114 are substantially parallel. The rear plate 116 extends downwardly from the bottom horizontal plate 114. The top horizontal plate 114 includes a pair of slots 52*a*, with the pair of parallel tubes 46*a* extending through the slots 52*a*. The bottom horizontal plate 114 also includes a pair of openings 118, with the pair of parallel tubes 46*a* also extending through the openings 118. The second plate 102 of the hinge plate 48*a* of the connector assembly 16*a* can be connected to a bottom of the bottom horizontal plate 114 (for example, by welding the second plate 102 to the bottom horizontal plate 114, by welding a stud to the second plate 102 and inserting the stud through the bottom horizontal plate 114 and connecting a nut to the stud, or by welding a nut to the second plate 102 and inserting a stud through the bottom horizontal plate 114 and connecting the stud to the welded nut). It is also contemplated that the second plate 102 of the hinge plate 48*a* of the connector assembly 16*a* can be connected to a front of the front side plate 112 (for example, by welding the second plate 102 to the front side plate 112, by welding a stud to the second plate 102 and inserting the stud through the front side plate 112 and connecting a nut to the stud, or by welding a nut to the second plate 102 and inserting a stud through the front side plate 112 and connecting the stud to the welded nut). In the illustrated example, the hinge 101 between the first plate 100 and the second plate 102 of the hinge plate 48*a* of the connector assembly 16*a* is located adjacent the meeting point between the front side plate 112 and the bottom horizontal plate 114 of the upper cross member 22a.

The illustrated head restraint 14a (FIG. 4) includes the padded head portion 54a and the pair of stem tubes 56a. The stem tubes 56a are configured to be inserted into tops of the parallel tubes 46a of the first member 26a of the connector assembly 16a as is well known to those skilled in the art. It is contemplated that the stem tubes 56a and thereby the head restraint 14a can be vertically adjustably inserted into the parallel tubes 46a of the first member 26a of the connector assembly 16a to allow the padded head portion 54a to be raised and lowered.

The illustrated second member 28a of the connector assembly 16a is pivotally connected to the first member 26a of the connector assembly 16a to allow movement of the second member 28a to move the first member 26a. The illustrated second member 28a includes a U-shaped wire member 58a. The U-shaped wire member 58a includes a first side wire 60a, a second side wire 62a and a bottom wire 64a connecting the first side wire 60a to the second side wire 62a. The bottom wire 64a is U-shaped and includes a pair of side wire sections 120 each extending through sliding joints 122 connected to the bottom cross member 24a of the seat 12a. It is contemplated that the side wire section 120 could include molded anti-squeak bushings for allowing the wire sections 120 to slide through the sliding joints 120 without too much noise. Therefore, in the illustrated embodiment, the sliding joints 122 define the lower pivot point 42a. The first side wire 60a includes a bottom L-shaped section 124 connected to the bottom wire 64a, an angled middle section 126 and a top hook section 128. Likewise, the second side wire 62a includes a bottom L-shaped section 130 connected to the bottom wire 64a, an angled middle section 132 and a top hook section 134. As illustrated in FIG. 3, the top hook section 128 of the first side wire 60a and the top hook section 134 of the second side wire 62a extend around the pair of pivot rollers 108 on the U-shaped pivot rod 106. The top hook section 128 of the first side wire 60a and the top hook section 134 of the second side wire 62a are allowed to rotate about the pivot rollers 108, thereby defining the middle pivot point 40a.

In the illustrated example, aft movement of the middle pivot point 40a results in fore movement of the head restraint 14a. During a crash situation, the torso of the occupant will press against the second member 28a, thereby rotating the second member 28a rearward about the lower pivot point 42a (and with the side wire sections 120 of the bottom wire 64a of the second member 28a sliding through the sliding joints 122). It is contemplated that the first side wire 60a and the second side wire 62a of the second member 28a could include a lumbar support mat 150 extending therebetween to assist the torso of the occupant in rotating the second member 28a. Rotation of the second member 28a about the lower pivot point 42a will also cause the middle pivot point 40a to move rearward. Rearward or aft movement of the middle pivot point 40a causes the bottom end of the first member 26a to rotate rearward. Therefore, the first member 26a will rotate in a clockwise direction about the upper pivot point 34a, causing the first plate 100 of the hinge plate assembly 48a to rotate, the tops of the parallel tubes 46a to slide upward and forward through the slots 52a and the openings 118 in the upper cross member 22a, and the head restraint 14a to move upward and forward. As illustrated in FIG. 3, the seat 12a can include a pair of springs 88a connected to and extending between the first side member 18a and the second side member 20a of the seat 12a and the push plate 104 of the first member 26a to bias the middle pivot point 40a forward and to move or maintain the active head restraint system 10a in the initial position.

In the illustrated active head restraint system 10a, the upper pivot point 34a and the lower pivot point 42a do not change position. Therefore, the upper pivot point 34a is fixed in position relative to the upper cross member 22a of the seat 12a and the first member 26a of the connector assembly 16a. Furthermore, the lower pivot point 42a is fixed in position relative to the lower cross member 24a. In the illustrated example, the lower pivot point 42a is not fixed in position relative to the second member 28a of the connector assembly 16a as the second member 28a of the connector assembly 16a can move relative to the lower pivot point 42a, although the second member 28a of the connector assembly 16a continues to pivot about the lower pivot point 42a. Moreover, it is contemplated that at least one of the first member 26a and the second member 28a is configured to lengthen during aft movement of the middle pivot point 40a. For example, the first member 26a or second member 28a could either or both comprise two telescoping members.

Figure 6:
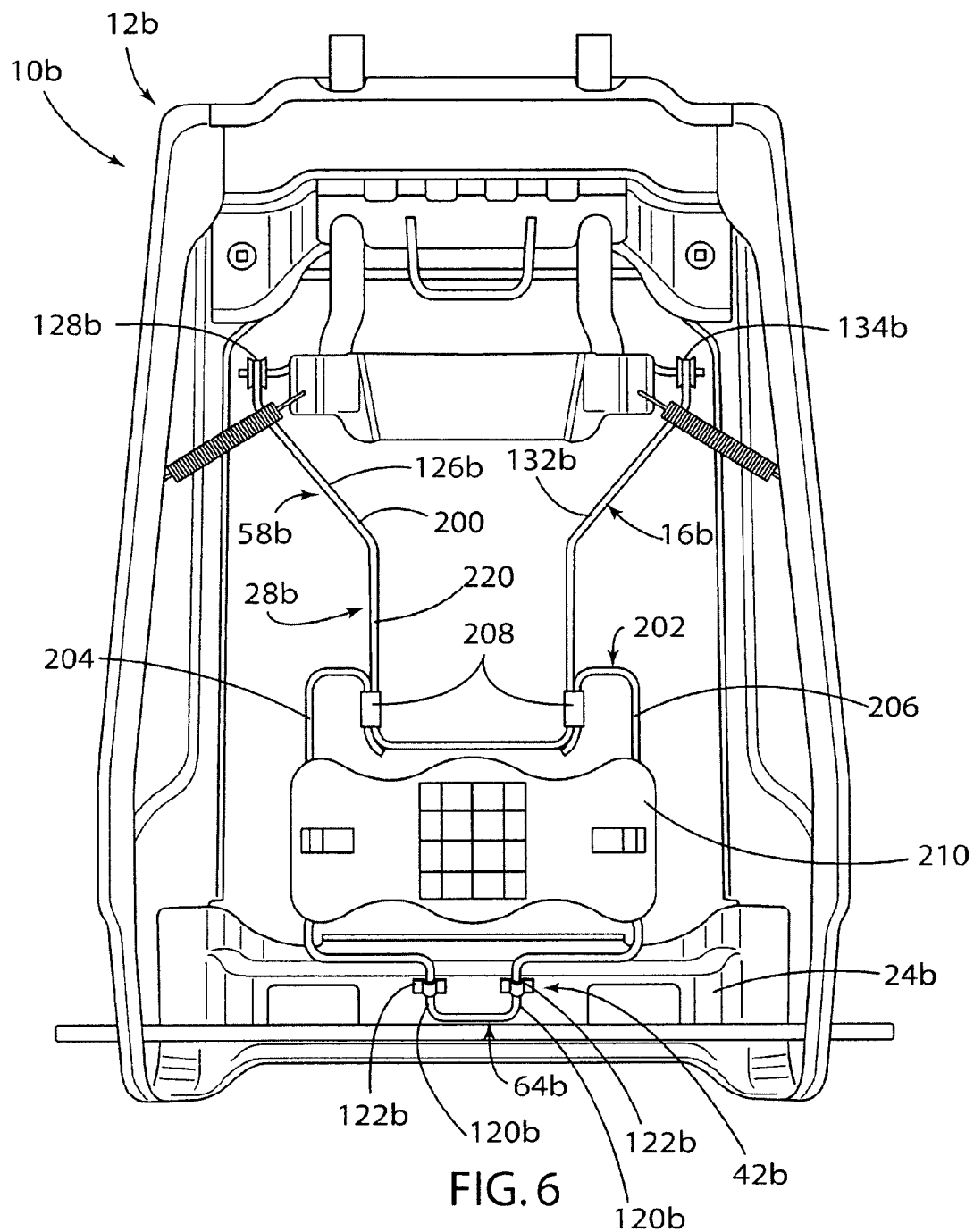
FIG. 6 is a front view of the active head restraint system of a third embodiment of the present invention.

The reference numeral 10b (FIG. 6) generally designates another embodiment of the present invention, having a third embodiment for the active head restraint system. Since bracket assembly 10b is similar to the previously described active head restraint system 10a, similar parts appearing in FIGS. 3-5 and FIG. 6, respectively, are represented by the same, corresponding reference number, except for the suffix "b" in the numerals of the latter. The active head restraint system 10b as illustrated in FIG. 6 is identical to the second embodiment of the active head restraint system 10a as illustrated in FIG. 3, except the second member 28b of the connector assembly 16b is different than the second member 28a of the connector assembly 16a. The illustrated second member 28b includes a two part wire member 58b. The two part wire member 58b includes a top U-shaped wire member 200 and a bottom U-shaped wire member 202. The top U-shaped wire member 200 includes a first side top hook section 128b, a first side angled middle section 126b, a second side top hook section 134b, a second side angled middle section 132b and a bottom U-shaped subsection 220 connected to the first side angled middle section 126b and the second side angled middle section 132b. The bottom U-shaped wire member 58b includes a first side C-shaped section 204, a second side reversed C-shaped section 206 and a bottom wire 64b connecting the first side C-shaped section 204 to the second side reversed C-shaped section 206. The bottom wire 64b is U-shaped and includes a pair of side wire sections 120b each extending through sliding joints 122b connected to the bottom cross member 24b of the seat 12b. Therefore, in the illustrated embodiment, the sliding joints 122b define the lower pivot point 42b. The top of the first side C-shaped section 204 and the second side reversed C-shaped section 206 are connected to the bottom U-shaped subsection 220 of the top U-shaped wire member 200 by connection members 208. Therefore, the top U-shaped wire member 200 and the bottom U-shaped wire member 202 define a substantially rigid two part wire member 58b. The fasteners 208 can comprise any member from connecting the top U-shaped wire member 200 to the bottom U-shaped wire member 202 (e.g., plastic sleeves). It is contemplated that the bottom U-shaped wire member 202 can have an adjustable lumbar support mat 210 (manual or powered) connected thereto.

Figure 7:
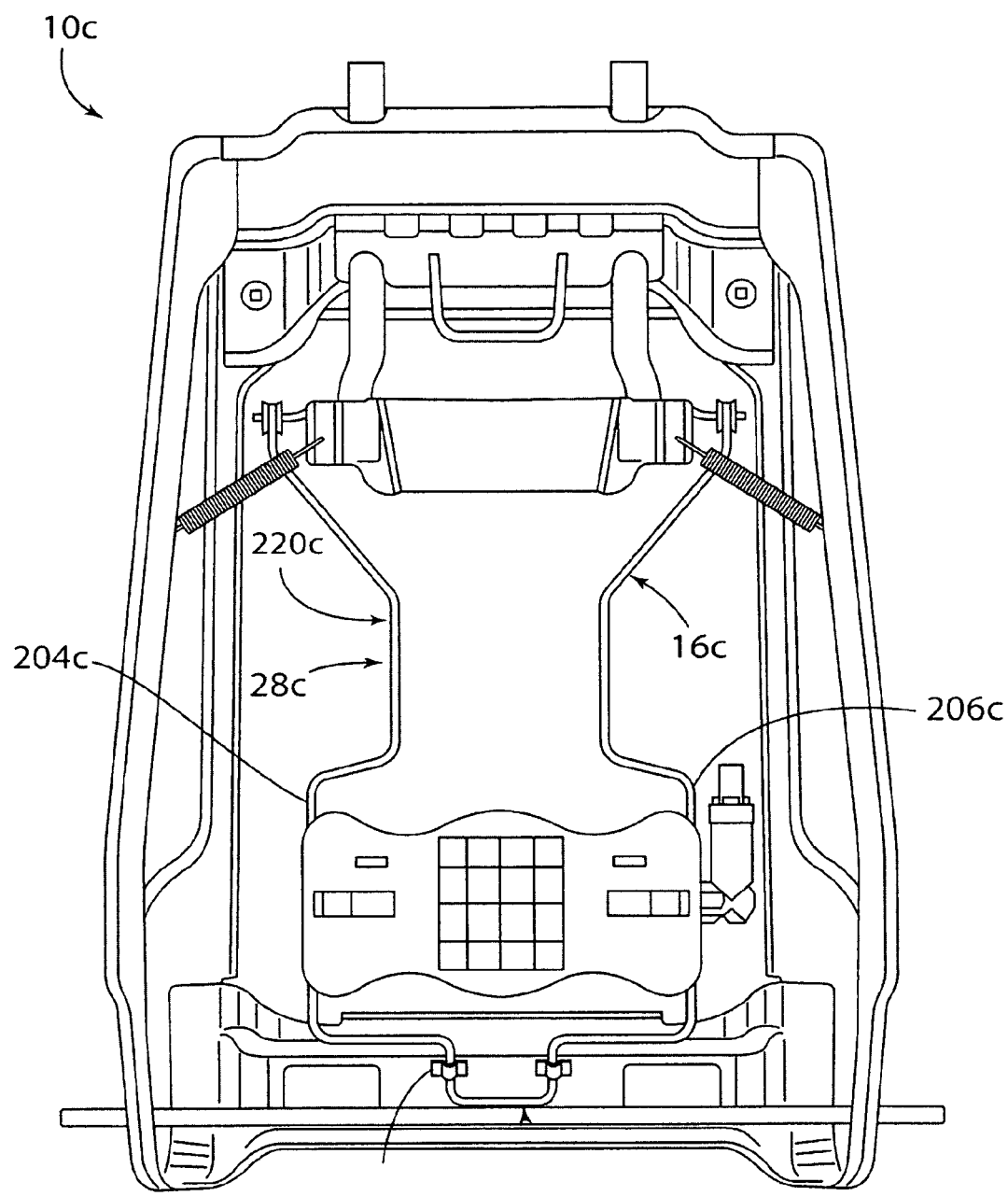
FIG. 7 is a front view of the active head restraint system of a fourth embodiment of the present invention.

The reference numeral 10c (FIG. 7) generally designates another embodiment of the present invention, having a fourth embodiment for the active head restraint system. Since bracket assembly 10c is similar to the previously described active head restraint system 10b, similar parts appearing in FIG. 6 and FIG. 7, respectively, are represented by the same, corresponding reference number, except for the suffix "b" in the numerals of the latter. The active head restraint system 10c as illustrated in FIG. 7 is identical to the third embodiment of the active head restraint system 10b as illustrated in FIG. 6, except the second member 28c of the connector assembly 16c is different than the second member 28b of the connector assembly 16b. Namely, the illustrated second member 28c comprises a one-part wire member with tops of the first side C-shaped section 204c and the second side reversed C-shaped section 206c being integrally connected to the bottoms of the subsection 220c instead of by connection members 208.

It is to be understood that variations and modifications can be made on the aforementioned structure without departing from the concepts of the present invention. Further, it is to be understood that such concepts are intended to be covered by the following claims unless these claims by their language expressly state otherwise.

We claim:

1. An active head restraint system for an occupant of an automotive vehicle comprising:
    a seat having a first side member, a second side member, an upper cross member and a lower cross member;
    a head restraint configured to support a head of the occupant; and
    a connector assembly connected with the head restraint and the seat, the connector assembly having a first member and a second member, the connector assembly including only three pivot points comprising an upper pivot point, a middle pivot point and a lower pivot point;
    the first member having a first top end and a first bottom end, with the first top end being connected to the head restraint and being pivotally connected to the upper cross member at the upper pivot point; and
    the second member having a second top end and a second bottom end, with the second top end being pivotally connected to the first bottom end of the first member at the middle pivot point, and the second bottom end being pivotally connected to the lower cross member at the lower pivot point;
    wherein the upper pivot point is fixed relative to the upper cross member and the first member, and the first member pivots about the upper pivot point;
    wherein the lower pivot point is fixed relative to the lower cross member and the second member pivots about the lower pivot point; and
    wherein aft movement of the middle pivot point results in fore movement of the head restraint.

2. The active head restraint system of claim 1, wherein:
    at least one of the first member and the second member is configured to lengthen during aft movement of the middle pivot point.

3. The active head restraint system of claim 1, wherein:
    the second member is configured to stretch during aft movement of the middle pivot point.

4. The active head restraint system of claim 1, wherein:
    the middle pivot point is free to move relative to the seat.

5. The active head restraint system of claim 1, further including:
    at least one biasing member connected to the seat and the connector assembly for biasing the middle pivot point to a fore position.

6. The active head restraint system of claim 5, wherein:
    the at least one biasing member is connected to the connector assembly at the middle pivot point.

7. The active head restraint system of claim 1, further including:
    a push plate connected to the connector assembly and configured to receive a back of the occupant during vehicle impact.

8. The active head restraint system of claim 7, wherein:
    the push plate is connected to the second member of the connector assembly.

9. The active head restraint system of claim 1, wherein:
    the connector assembly includes at least one rod extending through the upper cross member; and
    the upper cross member includes an elongated slot for each rod passing therethrough, the elongated slot allowing the at least one rod of the connector assembly to slide along a length of the elongated slot along with allowing the at least one rod of the connector assembly to slide through the elongated slot.

10. The active head restraint system of claim 9, wherein:
    the at least one rod is pivotally connected to the upper cross member by a hinge; and
    the hinge includes a notch for each at least one rod, the at least one rod being located within the notch and connected to the hinge at the notch.

11. The active head restraint system of claim 1, further including:
    biasing members connected to the first and second side members and the first member, the biasing members biasing the first bottom end to a fore position.

12. An active head restraint system for an occupant of an automotive vehicle comprising:
    a seat having a first side member, a second side member, an upper cross member and a lower cross member;
    a head restraint configured to support a head of the occupant;
    a push plate configured to receive a back of the occupant during vehicle impact; and
    a connector assembly connected with the push plate and head restraint, the connector assembly having a first member and a second member, the connector assembly including only three pivot points comprising an upper pivot point, a middle pivot point and a lower pivot point;
    the first member having a first top end and a first bottom end, with the first top end being connected to the head restraint and being pivotally connected to the upper cross member at the upper pivot point;
    the second member having a second top end and a second bottom end, with the second top end being pivotally connected to the first bottom end of the first member at the middle pivot point, and the second bottom end being pivotally connected to the lower cross member at the lower pivot point; and
    at least one of the first member and the second member being connected to the push plate such that aft movement of the push plate results in fore movement of the head restraint;
    wherein the upper pivot point is fixed relative to the upper cross member and the first member, and the first member pivots about the upper pivot point; and
    wherein the lower pivot point is fixed relative to the lower cross member and the second member pivots about the lower pivot point.

13. The active head restraint system of claim 12, wherein:
    at least one of the first member and the second member is configured to lengthen during aft movement of the push plate.

14. The active head restraint system of claim 12, wherein:
the second member is configured to stretch during aft movement of the push plate.

15. The active head restraint system of claim 12, wherein:
the middle pivot point is free to move relative to the seat.

16. The active head restraint system of claim 12, further including:
at least one biasing member connected to the seat and the connector assembly for biasing the middle pivot point to a fore position.

17. The active head restraint system of claim 16, wherein:
the at least one biasing member is connected to the connector assembly at the middle pivot point.

18. The active head restraint system of claim 12, wherein:
the push plate is connected to the second member of the connector assembly.

19. The active head restraint system of claim 12, wherein:
the connector assembly includes at least one rod extending between the head restraint and the push plate;
the at least one rod is pivotally connected to the upper cross member by a hinge; and
the hinge includes a notch for each at least one rod, the at least one rod being located within the notch and connected to the hinge at the notch.

20. The active head restraint system of claim 12, wherein:
biasing members are connected to the first and second side members and the first member, the biasing members biasing the first bottom end to a fore position.

21. A seat comprising:
upper and lower cross-members;
a head restraint; and
an assembly connected with the head restraint and the seat;
the assembly having a first end connected to the head restraint and fixedly and pivotally connected to the upper cross-member, and a second end that slides through and that is pivotable about the lower cross-member;
wherein aft movement of a middle pivot point of the assembly results in fore movement of the head restraint.

22. A seat comprising:
upper and lower cross-members;
a head restraint; and
an assembly having a first end connected to the head restraint and fixedly and pivotally connected to the upper cross-member, a second end pivotable about the lower cross-member;
wherein aft movement of a middle pivot point of the assembly results in fore movement of the head restraint; and
wherein the assembly includes only three pivot points.

* * * * *